(12) United States Patent
Kuehn et al.

(10) Patent No.: US 7,980,098 B2
(45) Date of Patent: Jul. 19, 2011

(54) METHOD FOR PRODUCING AN OPTICAL COMPONENT OF SYNTHETIC QUARTZ GLASS WITH ENHANCED RADIATION RESISTANCE, AND BLANK FOR PRODUCING THE COMPONENT

(75) Inventors: Bodo Kuehn, Gelnhausen (DE); Steffen Kaiser, Hanau (DE); Denis Kassube, Rodenbach (DE); Kerstin Merget, Alzenau (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 421 days.

(21) Appl. No.: 12/148,338

(22) Filed: Apr. 18, 2008

(65) Prior Publication Data
US 2009/0004088 A1  Jan. 1, 2009

(30) Foreign Application Priority Data
Apr. 20, 2007  (DE) .................. 10 2007 019 154

(51) Int. Cl.
C03B 25/00  (2006.01)
C03B 27/00  (2006.01)
C03B 27/012 (2006.01)
(52) U.S. Cl. .......................... 65/434; 65/117
(58) Field of Classification Search ............. 65/104.117, 65/427, 137, 111–119
See application file for complete search history.

(56) References Cited

U.S. PATENT DOCUMENTS

| 5,086,352 A | 2/1992 | Yamagata et al. |
| 6,174,830 B1 | 1/2001 | Jinbo et al. |
| 6,653,786 B2 | 11/2003 | Fukushima et al. |
| 6,732,546 B1 | 5/2004 | Yajima et al. |
| 2005/0217318 A1* | 10/2005 | Kuhn et al. ............. 65/32.3 |
| 2006/0234848 A1 | 10/2006 | Kuehn et al. |

FOREIGN PATENT DOCUMENTS

| DE | 102005017752 A1 | 10/2006 |
| EP | 0401845 A1 | 12/1990 |
| EP | 0921104 A1 | 6/1999 |
| EP | 1134197 A1 | 9/2001 |
| EP | 1261018 A2 | 11/2002 |
| EP | 1586544 A1 | 10/2005 |
| JP | 2002121038 A | 4/2002 |

OTHER PUBLICATIONS

EPODOC English language abstract for JP2002121038, Apr. 23, 2002.

* cited by examiner

Primary Examiner — Matthew J Daniels
Assistant Examiner — Jodi Cohen
(74) Attorney, Agent, or Firm — Tiajoloff and Kelly LLP

(57) ABSTRACT

To optimize an optical component of synthetic quartz glass, in the case of which a quartz glass blank is subjected to a multistage annealing treatment, with respect to compaction and central birefringence, the present invention suggests a method comprising the following steps:
(a) a first treatment phase during which the quartz glass blank is treated in an upper temperature range between 1130° C. and 1240° C.,
(b) cooling the quartz glass blank at a first-higher-mean cooling rate to a quenching temperature below 1100° C., a fictive temperature with a high mean value of 1100° C. or more being reached in the quartz glass,
(c) a second treatment phase which comprises cooling of the quartz glass blank at a second-lower-mean cooling rate, and in which the quartz glass blank is treated in a lower temperature range between 950° C. and 1100° C. such that a fictive temperature is reached in the quartz glass with a low mean value which is at least 50° C. lower than the high mean value of the fictive temperature according to method step (b).

23 Claims, 3 Drawing Sheets

US 7,980,098 B2

Figure 1:
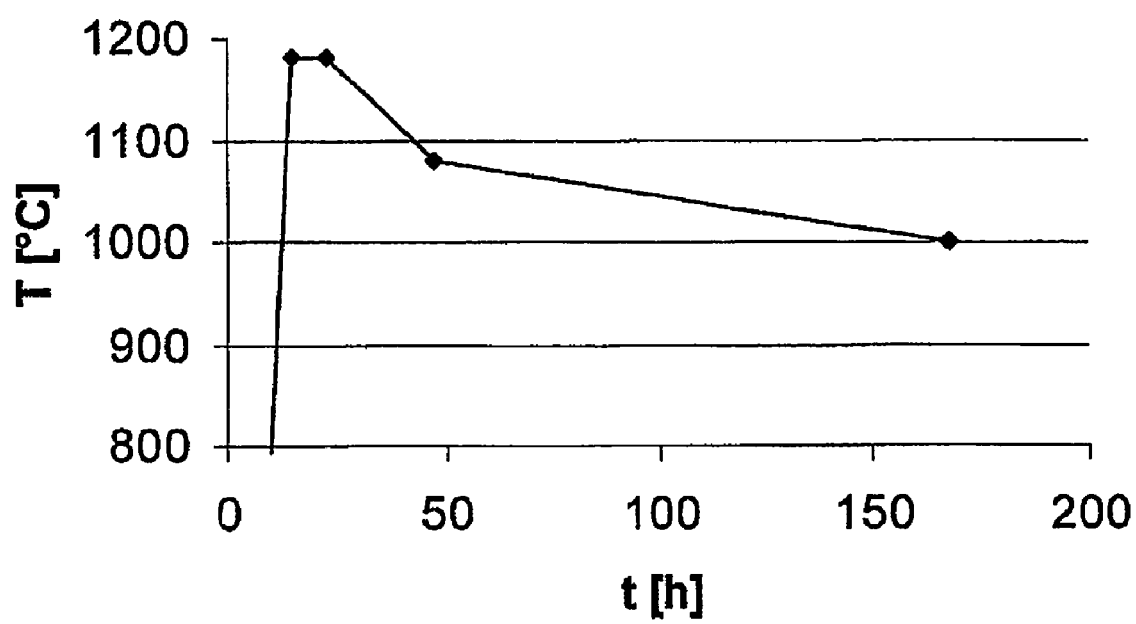

METHOD FOR PRODUCING AN OPTICAL COMPONENT OF SYNTHETIC QUARTZ GLASS WITH ENHANCED RADIATION RESISTANCE, AND BLANK FOR PRODUCING THE COMPONENT

DETAILED DESCRIPTION

The present invention relates to a method for producing an optical component of synthetic quartz glass with enhanced radiation resistance for use in a microlithographic device at an operating wavelength below 250 nm, with a quartz glass blank being provided and subjected to a multi-stage annealing treatment.

Furthermore, the present invention relates to a blank for producing an optical component for use in a microlithographic device, particularly for immersion lithography, at an operating wavelength below 250 nm.

PRIOR ART

Optical components of quartz glass are used for transmitting high-energy ultraviolet laser radiation in microlithographic exposure and projection systems for producing large-scale integrated circuits on substrates. Modern microlithographic projection systems operate with excimer lasers emitting high-energy pulsed UV radiation of a wavelength of 248 nm (KrF laser) or of 193 nm (ArF laser). The general demand is here made that a light distribution provided in the area of an object plane of the illumination system should be transmitted as homogeneously as possible and in an angle-maintaining way and with the highest resolution possible in an image plane of the projection objective conjugated with respect to the object plane on the substrate to be exposed. Every change in the angle spectrum generated in the optical path leads to a distortion of the intensity distribution in the objective pupil, which results in asymmetric irradiation and thus to a deterioration of the imaging performance.

During the intended use, damage to the quartz glass network structure caused by UV radiation plays a decisive role. A known phenomenon in this connection is the so-called 'compaction' that arises during or after laser irradiation with a high energy density. This effect manifests itself in a substantially radially symmetrical local increase in density, which leads to a rise in the refractive index and thus to a deterioration of the imaging properties of the optical component. Upon irradiation with linearly polarized UV laser radiation a radially asymmetric anisotropic density and refractive-index change of the quartz glass is also observed, said change also causing a change in the imaging properties of the component and being called "central birefringence" in the following.

The quartz glass for the quartz glass blank is produced by flame hydrolysis of silicon-containing start substances by means of methods which are generally known under the names VAD (vapor phase axial deposition), OVD (outside vapor phase deposition), MCVD (modified chemical vapor deposition) and PCVD or also PECVD (plasma enhanced chemical vapor deposition) methods. In all of these procedures $SiO_2$ particles are normally produced by means of a burner and deposited layer by layer on a carrier which is moved relative to a reaction zone. An immediate vitrification of the $SiO_2$ particles is observed ("direct vitrification") at an adequately high temperature in the area of the carrier surface. By contrast, in the so-called "soot method" the temperature during deposition of the $SiO_2$ particles is so low that a porous soot layer is obtained that is sintered in a separate method step into a transparent quartz glass. Both direct vitrification and soot method yield blanks of synthetic quartz glass in the form of cylinders, rods, blocks, tubes or plates, which are further processed into optical components such as lenses, windows, filters, mask plates for use in microlithography.

To reduce mechanical stresses inside the blank and to achieve a homogeneous distribution of the fictive temperature, the quartz glass blank is normally annealed with great care. EP 0 401 845 A1, for instance, suggests an annealing program in which the blank is subjected to a holding period lasting for 50 hours at a temperature of about 1100° C. and is then cooled in a slow cooling step at a mean cooling rate of 2° C./h to 900° C. before free cooling is carried out in the closed furnace.

A multi-stage annealing treatment for achieving a compaction-resistant glass structure is suggested in EP 1 586 544 A1. A quartz glass blank having a hydroxyl group content between 10 wtppm and 250 wtppm is first heated to 11300 during a holding period of 8 hours and is then cooled at a mean cooling rate of 4° C./h to a temperature of 1030° C. and is held at said temperature for 4 hours. Subsequently, the quartz glass cylinder is cooled at a higher mean cooling rate to a temperature of 300° C., whereupon the furnace is switched off, and the quartz glass cylinder is left to the free cooling of the furnace. Similar annealing programs are also known from EP 921 104 A1 and EP 1 134 197 A1.

These multi-stage annealing treatments with treatment phases at a higher and a lower annealing temperature have in common that cooling from the higher annealing temperature is carried out at a slower rate than cooling from the lower annealing temperature. The slow cooling from the higher annealing temperature gives the network structure of the quartz glass enough time to relax, so that stress birefringence is reduced and a low fictive temperature is obtained, which is desired in general.

The demands made on components of synthetic quartz glass for use in microlithography at a wavelength of 193 nm in terms of high energy density, great pulse number and maximally tolerable wavefront distortion are however getting higher and higher, and it is foreseeable that despite sophisticated aftertreatment methods the previous standard quartz glass qualities will no longer satisfy these demands.

OBJECT OF THE INVENTION

It is therefore the object of the present invention to provide a method for producing an optical component of synthetic quartz glass that is optimized with respect to compaction and central birefringence and shows a comparatively insignificant wavefront distortion in the intended use. Moreover, it is the object of the present invention to provide a blank of synthetic quartz glass that is suited for producing the component.

Starting from the method of the above-mentioned type, this object is achieved according to the invention in that the annealing treatment of the quartz glass blank comprises the following method steps:

(a) a first treatment phase during which the quartz glass blank is treated in an upper temperature range between 1130° C. and 1240° C. during a first treatment period, (b) cooling the quartz glass blank at a first high mean cooling rate to a quenching temperature below 1100° C., a fictive temperature with a high mean value of 1100° C. or more being reached in the quartz glass, (c) a second treatment phase which comprises cooling of the quartz glass blank at a second mean cooling rate, and in which the quartz glass blank is treated in a lower temperature range between 950° C. and 1100° C. during a second treatment period such that a fictive temperature is reached in the quartz glass with a low mean value which is at least 50° C. lower than the high mean value of the fictive temperature according to method step (b).

As a rule, a low fictive temperature has an advantageous effect on the UV radiation resistance of quartz glass, particularly on the compaction behavior thereof.

On the other hand, however, there is no strict correlation between fictive temperature and compaction upon UV irradiation, and rapid cooling from an elevated annealing temperature might even lead to an improved radiation resistance, as is described in the above-mentioned EP 1 586 544 A1 although rapid cooling tends to lead to a rather high fictive temperature.

The inconsistency inherent to these observations is eliminated by the present invention. It is here assumed that, apart from the fictive temperature, another structural parameter plays a decisive role for the radiation resistance, said parameter, like the fictive temperature, being set in dependence upon the thermal history of the quartz glass. To be more specific, the invention is based on a model which assumes that the quartz glass may have different phases differing in their sensitivity to UV radiation and possibly also in their density. The phase formed at a high temperature shall be called "high-temperature phase" in the following. Said phase exhibits a higher density and thus in conjunction therewith a lower tendency to compaction. In comparison therewith, the "low-temperature phase" that is thermodynamically stable at a low temperature shows a lower density and a higher tendency to compaction upon irradiation. When the quartz glass blank is cooled down from a high temperature, there is a transformation from the high-temperature phase to the low-temperature phase, but the kinetics of the transformation may be inhibited.

As a consequence, the following problems arise during annealing:

1. It must be ensured that a high-temperature phase proportion that is as great as possible is formed in the quartz glass of the blank at the beginning.

This is achieved according to the teaching of the invention in that the quartz glass blank is treated at a high annealing temperature between 1130° C. and 1230° C. The temperature treatment may comprise holding at a constant temperature or cooling or heating processes within said temperature range. It is the aim to form a great proportion of high-temperature phase in the quartz glass in a distribution that is as homogeneous as possible.

2. During cooling from the high annealing temperature a proportion of high-temperature phase that is as small as possible should transform into low-temperature phase.

This is guaranteed according to the invention in that cooling of the quartz glass blank from the high treatment temperature to a lower temperature below 1100° C. takes place at a comparatively high mean cooling rate (this rapid cooling will also be called "quenching" in the following). The kinetically influenced phase transformation to the undesired low-temperature phase is thus suppressed. Since methods for the quantitative analysis of the high-temperature phase or the low-temperature phase have so far not been known, the proportion of the high-temperature phase still found in the quartz glass after quenching cannot be determined directly without difficulty, but can at best be estimated indirectly with the help of UV damage measurements on the finished quartz glass blank. This, however, is extremely complicated. For reasons of practicability the fictive temperature of the quartz glass after completion of the first treatment phase is therefore used as a measure of the degree of phase transformation on the comprehensible assumption that a rapid quenching of the quartz glass should be accompanied by an enhanced fictive temperature and by an enhanced degree of maintenance of the high-temperature phase at the same time. Hence, a fictive temperature of at least 1100° C. averaged across the volume of the blank should be set. In comparison with UV damage measurements the mean fictive temperature of the quartz glass blank can be measured and calculated relatively easily. However, as discussed above, the fictive temperature is only used as an auxiliary means in order to ensure that an enhanced degree of the high-temperature phase is maintained after the first treatment phase; besides that, a high fictive temperature has no practical importance for the properties of the quartz glass.

3. Just the opposite is true. The fictive temperature that is as low as possible is desired for the intended use of the quartz glass blank.

The desired low fictive temperature is set according to the teaching of the invention by means of the second treatment phase by way of an annealing treatment at a lower temperature between 950° C. and 1100° C. This annealing treatment will only be successful within a temperature range in which the advantageous effect of the gradual reduction of the fictive temperature of the quartz glass outweighs the harmful effect through progressive phase transformation into low-temperature phase. In other words, the treatment temperature is on the one hand high enough to permit a relaxation of the network structure and a reduction of the fictive quartz glass temperature, which has so far been too high, in finite treatment periods and it is on the other hand low enough to ensure a continuous kinetic or thermodynamic inhibition of a phase transformation into low-temperature phase. However, the reduction of the relatively high fictive temperature of the quartz glass by treatment in the lower temperature range, i.e. at a comparatively low temperature, requires long treatment times. A reduction of the high mean value of the fictive temperature by at least 50° C. is however enough as a rule. As has been described above for the treatment in the upper temperature range, the treatment in the lower temperature range may also comprise holding at a constant temperature as well as cooling or heating processes within said temperature range.

It can be summarized that the method according to the invention is characterized by a treatment phase (a) in order to establish a high degree of high-temperature phase in the quartz glass, followed by a multi-step cooling phase which comprising a first cooling step (b) which is a quenching treatment characterized by a relatively high mean cooling rate in order to suppress a transformation of the high-temperature phase in low high-temperature phase, followed by a second cooling step (c) which is an annealing treatment characterized by a relatively low mean cooling rate in order to establish a fictive temperature as low as possible.

In the context of the present invention a "high mean cooling rate" means that the quotient of the range of temperature passed between step (a) and (b) and the time for passing this temperature range is large enough to establish a high mean fictive temperature above 1100° C. and which is larger than the "low mean cooling rate" which is quotient of the range of temperature passed between step (b) and (c) and the time for passing this temperature range and which is at the same time low enough to establish a low mean fictive temperature being at least 50° C. lower than the high fictive temperature.

According to the invention the first mean cooling rate for cooling the quartz glass blank from the upper temperature range is greater than the second mean cooling rate for cooling the quartz glass blank from the lower temperature range. The faster the quenching process takes place from the temperature in the upper temperature range, the smaller is the proportion of the quartz-glass network structure transformed into low-temperature phase.

The result is a great proportion of high-temperature phase which results in an enhanced density of the quartz glass and acts like an "anticipated" compaction of the glass structure on the whole. Therefore, the more compact network structure counteracts a local isotropic and anisotropic density change upon UV irradiation it has been found that a quartz glass blank can thereby be produced that is subject to lower compaction and central birefringence upon UV irradiation and thus produces a small wavefront distortion in the irradiated light distribution.

With standard finishing work, such as grinding, polishing, framing, or the like, an optical component is produced from a blank for use in a projection or exposure objective of a microlithographic device.

A hint at the formation of the so-called high-temperature and low-temperature phase in quartz glass is found in S. Sen et al. "Observation of an. Anomalous Density Minimum in Vitreous Silica"; Phys. Rev. Letters, Vol. 93, No. 12 (2004), p. 125902-1-125902-3.

This is also suggested by the quartz glass behavior which has been known for a long period of time and according to which quartz glass rapidly cooled from the temperature range between 1000° C. and 1500° C. has a lower specific volume and thus a higher specific density than slowly cooled quartz glass. According to "R. Brückner, Silicon Dioxide; Encyclopedia of Applied Physics, Vol. 18 (1997), p. 101-131" this effect is due to an anomaly of synthetic quartz glass in which the profile of the specific volume in the range between 1000° C. and 1500° C. has a negative temperature coefficient; this means that the specific volume of quartz glass in this temperature range increases with a decreasing temperature, or in other words, the quartz glass rapidly cooled from the said temperature range with a high fictive temperature has a higher density than slowly cooled quartz glass with a lower fictive temperature.

A standard measuring method for determining the fictive temperature by way of measuring the Raman scattering intensity at a wave number of about 606 cm$^{-1}$ is described in "Ch. Pfleiderer et al.; "The UV-induced 210 nm absorption band in fused silica with different thermal history and stoichiometry"; J. Non-Cryst. Solids 159 (1993) 143-145".

It has turned out to be advantageous when the first treatment phase comprises annealing of the quartz glass blank in the temperature range of 1150° C. to 1210° C.

Annealing in the said temperature range facilitates the maintenance or the adequately rapid transformation of the quartz glass network structure into the desired high-temperature phase at a temperature that is as low as possible.

It has turned out to be equally advantageous when the second treatment phase comprises annealing in the temperature range of from 100° C. to 1100° C.

Annealing in the second treatment phase serves to lower the initially high fictive temperature of the quartz glass. The treatment at an annealing temperature within the above-mentioned range, i.e. at a mean temperature, results in a rapid relaxation of the network structure and economically still acceptable periods of time for lowering the fictive temperature. A treatment duration of at least 100 hours is however reasonable.

A procedure has turned out to be particularly useful wherein the quenching temperature is by at least 50° C., preferably by at least 80° C., lower than the treatment temperature in the upper temperature range.

The greater the temperature difference between the treatment temperature in the upper temperature range and the quenching temperature is, the more reliably can the undesired transformation of the network structure into low-temperature phase be avoided. On the other hand, quenching of the quartz glass over a large temperature range will render the subsequent setting of a low fictive temperature of the quartz glass more difficult. Quenching over a temperature range of more than 150° C. is therefore not preferred.

Advantageously, the quenching temperature is lower than 1090° C., preferably lower than 1070° C.

It has been found that rapid cooling to a temperature below 1090° C., preferably below 1070° C., transforms a small proportion of high-temperature phase. This is demonstrated by the fact that quartz glass components quenched to a correspondingly deep level can show a favorable compaction behavior if they are subsequently set to a low fictive temperature.

As explained above, the faster the quenching process takes place from the temperature in the upper temperature range, the smaller is the proportion of the quartz-glass network structure transformed into low-temperature phase. Therefore, the mean cooling rate during quenching is thus preferably a multiple of the mean cooling rate during cooling from the temperature from the low temperature range, i.e. at least twice the amount.

In this context it has turned out to be useful when the first mean cooling rate is at least 1° C./h, preferably at least 2° C./h, particularly preferably at least 4° C./h, and when the second mean cooling rate is less than 1° C./h, preferably less than 0.8° C./h.

A further improvement of the UV irradiation resistance of the quartz glass is achieved when the second treatment phase includes a time sequence of heating and cooling steps in the lower temperature range.

The setting of a fictive temperature that is as low as possible in the second treatment phase requires a modification of the network structure and a density change not only on a microscopic scale, but also a deformation on the macroscopic scale. This requires a relaxation of the network structure over the whole volume of the quartz glass block, also in order to reduce or avoid stresses. Surprisingly enough, it has been found that such a relaxation of the network structure of the whole quartz glass blank is facilitated by an oscillating annealing temperature in which temperature waves produced so to speak by heating and cooling processes encompass the whole blank.

It has proved to be useful when the multi-stage annealing treatment includes post-annealing in the temperature range between 650° C. and 850° C.

The quartz glass is here once again enabled to relax. The temperature distribution inside the quartz glass blank is homogenized, and real and "frozen-in" thermal gradients leading to stress birefringence are here reduced.

As for a favorable behavior towards compaction and central birefringence of the quartz glass blank, it is of advantage when the fictive temperature of the quartz glass is below 1045° C., preferably below 1035° C., after completion of the annealing treatment.

The lower the fictive temperature of the quartz glass, the better is its UV radiation resistance with respect to the damage mechanism of the compaction. On the other hand, the setting of a particularly low fictive temperature requires relatively long treatment periods in the lower temperature range because of the quenching of the quartz glass from the upper temperature range in the method according to the invention. Fictive temperatures below 1000° C. are therefore not achieved as a rule.

It has turned out to be particularly advantageous when the first treatment period lasts for at least 5 h.

The longer the treatment period at a high temperature is, the more reliably and reproducibly will the quartz glass blank reach a thermal balance and the more pronounced and homogeneous will the setting of the high-temperature phase be across the whole volume of the blank. The treatment period at a high temperature also encompasses one or several heating and cooling ramps as long as the blank has a temperature in the upper temperature range. Treatment durations of up to 40 hours are here easily possible.

As for the second treatment duration, it has turned out to be quite advantageous when the second treatment period lasts for at least 100 hours and for not more than 12 days.

As a rule, a long second treatment period of at least 100 hours is needed for setting the desired low fictive temperature of the quartz glass blank. However, treatment periods of more than twelve days are disadvantageous not only for reasons of costs, but also with respect to changes in the glass structure, particularly due to the formation of inhomogeneities caused by the out-diffusion of components and contamination by the in-diffusion of impurities and by an increasing transformation into low-temperature phase.

Furthermore, it is advantageous when the quartz glass blank is loaded with hydrogen after the annealing treatment, the mean hydrogen content of the quartz glass being set to a value between $5 \times 10^{15}$ and $1 \times 10^{17}$ molecules/cm³.

Hydrogen is known to show a healing effect relative to defects caused by UV irradiation in quartz glass. In the method of the invention a possible initial hydrogen content of the quartz glass is however removed prior to annealing to avoid the formation of SiH groups. Therefore the quartz glass blank is subsequently loaded with hydrogen. The higher the hydrogen content is the greater is its defect-healing effect upon UV irradiation. On the other hand, a high hydrogen content may contribute to the formation of SiH groups and leads to a prolongation of loading times and an increase in the apparatus needed therefor, so that the mean hydrogen group content of the quartz glass is preferably less than $1 \times 10^{17}$ molecules. SiH groups in quartz glass are not desired because upon irradiation with high-energy UV light a so-called E' center is formed therefrom, said center causing absorption at a wavelength of 210 nm and being also noticed in the neighboring UV wavelength range. To avoid the formation of SiH groups already during hydrogen loading, it is carried out at a low temperature below 500° C.

The hydrogen content ($H_2$ content) is determined with the help of a Raman measurement, which was suggested by Khotimchenko et al. for the first time ("Determining the Content of Hydrogen Dissolved in Quartz Glass Using the Methods of Raman Scattering and Mass Spectrometry" Zhurnai Prikladnoi Spektroskopii, Vol. 46, No. 6 (June 1987), pp. 987-991).

In a particularly preferred variant of the method the mean hydroxyl group content of the quartz glass is set to a value between 5 wtppm and 50 wtppm, preferably between 10 wtppm and 35 wtppm.

The viscosity of quartz glass and its relaxation behavior are essentially influenced by its hydroxyl group content (OH content). It must be assumed that the transformation from high-temperature phase to low-temperature phase is promoted by hydroxyl groups and accompanied by a rearrangement of hydroxyl groups. This rearrangement mechanism is the more likely and easier the more hydroxyl groups are available. Therefore, a low hydroxyl group content diminishes the sensitivity of the glass structure to phase transformation processes, and a quartz glass having a hydroxyl group content in the above-mentioned range is distinguished by a particularly low tendency to compaction. The above data on annealing temperatures and times, mean cooling rates and fictive temperatures were determined on quartz glass having a hydroxyl group content ranging from 5 wtppm to 50 wtppm. It must be assumed that the corresponding data in the case of quartz glass with a different hydroxyl group content differ therefrom.

The hydroxyl group content follows from a measurement of the IR absorption according to the method of D. M. Dodd and D. B. Fraser, "Optical determination of OH in fused silica", J. Appl. Physics, Vol. 37 (1966), p. 3911.

As for the blank made from synthetic quartz glass, the above-mentioned object starting from a blank of the above-mentioned type is achieved according to the invention in that the blank can be produced by means of the method according to the invention.

The quartz glass blank according to the invention is distinguished by its manufacturing method. This method aims at maintaining a "high-temperature phase" proportion that is as great as possible in the quartz glass of the blank in the course of the annealing process and at imparting an acceptable low fictive temperature to the quartz glass at the same time. The measures known from the prior art for setting a fictive quartz-glass temperature that is as low as possible counteract the maintenance of a high-temperature phase proportion that is as great as possible. The method of the invention as explained above in more detail teaches a convenient compromise permitting the manufacture of a quartz-glass blank with a compaction-resistant quartz glass structure.

As has already been mentioned above in the explanation of the method according to the invention, there are models that can explain the existence of high-temperature phase and low-temperature phase in quartz glass, but there are no methods for the quantitative determination of said phases. Possible is only an indirect and qualitative estimation based on UV damage measurements on the finished quartz glass blank.

It has been found that an optical component made from a quartz glass blank according to the invention is subjected to a comparatively small anisotropic and isotropic density change upon application with high-energy UV laser radiation, so that it is particularly well suited for an application for the transmission of linearly polarized UV radiation of a wavelength between 190 nm and 250 nm.

Furthermore, apart from a high-temperature phase proportion that is as great as possible, the finished blank according to the invention preferably shows a fictive temperature (on average) below 1045° C., particularly preferably below 1035° C., and a mean content of hydroxyl groups between 5 wtppm to 50 wtppm, preferably between 10 wtppm and 35 wtppm, and a mean hydrogen content in the range between $5 \times 10^{15}$ and $1 \times 10^{17}$ molecules/cm³.

As for its manufacture and further properties of the quartz glass blank according to the invention, reference is made to the above explanations regarding the method according to the invention.

PREFERRED EMBODIMENTS

Figure 2:
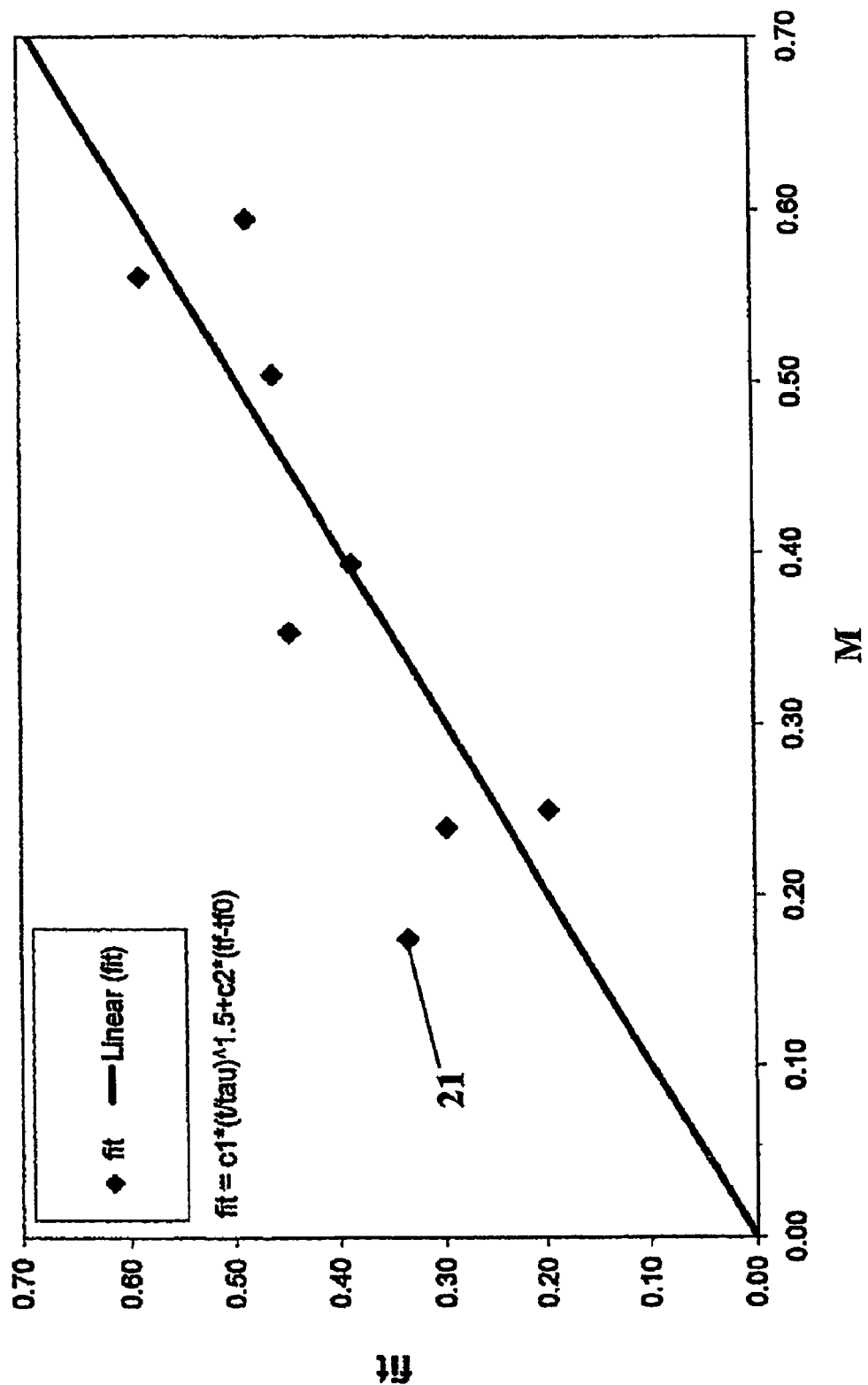
Figure 3:
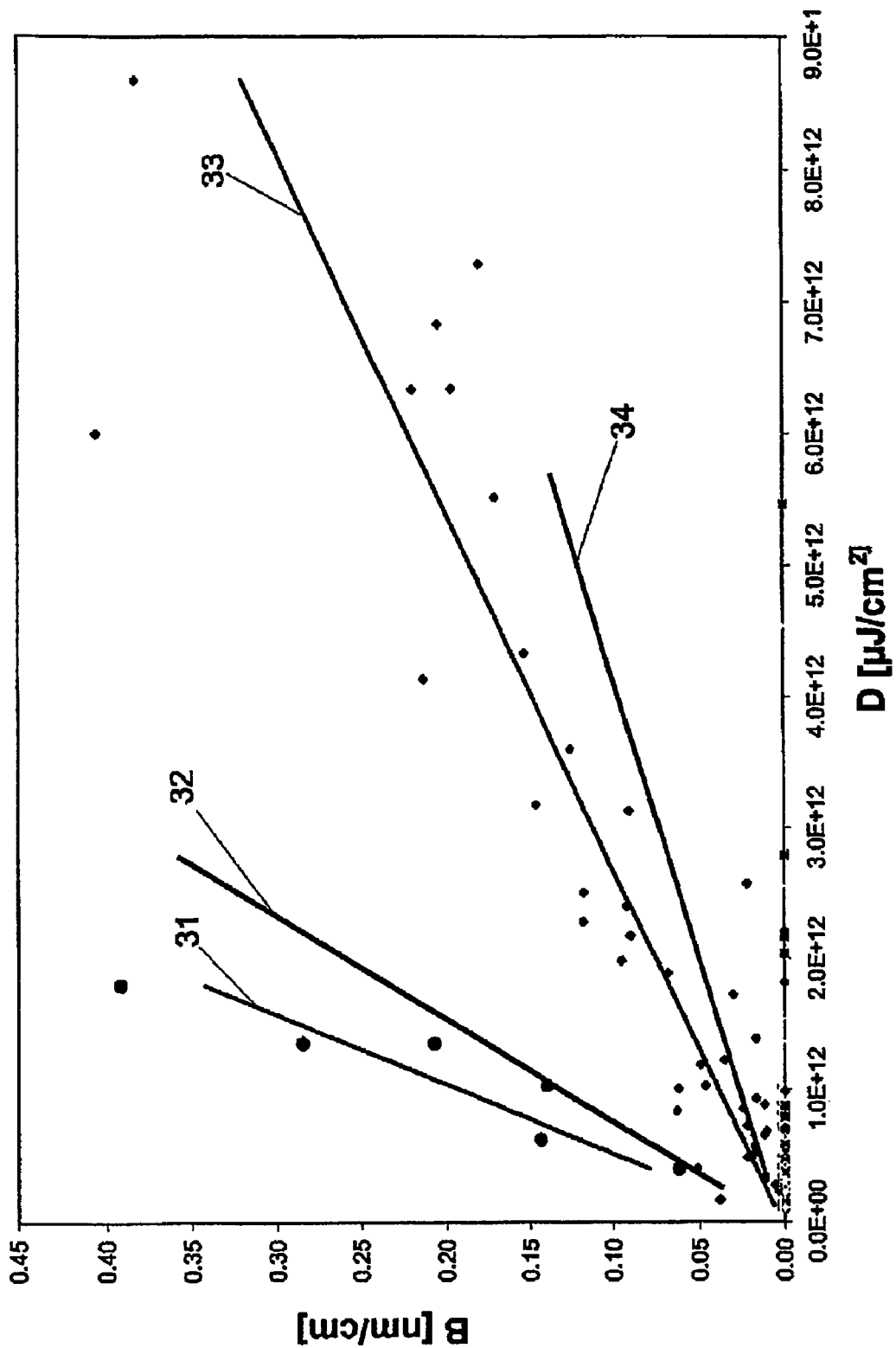

The invention will now be explained in more detail with reference to embodiments and a drawing, in which FIG. 1 shows an embodiment of a temperature/time profile for annealing a quartz glass blank according to the invention, in a schematic illustration;

FIG. 2 a diagram on the correlation between measured values and a model for compacting the quartz glass with respect to UV radiation in dependence upon its thermal history, and FIG. 3 a diagram on the dependence of the UV radiation-induced central birefringence in dependence upon the pulse number of the UV radiation for differently annealed quartz glass qualities.

SAMPLE PREPARATION

A soot body is produced by flame hydrolysis of $SiCl_4$ on the basis of the known OVD method. The soot body is dehydrated at a temperature of 1200° C. in a heating furnace with a heating element of graphite in vacuum. After completion of the dehydration treatment after 100 hours the mean hydroxyl group content of the soot body is about 30 wtppm.

The dried soot body is then introduced into a doping furnace and is treated therein at a temperature of 1100° C. for 20 hours in an atmosphere consisting of 5% oxygen, the balance being inert gas. This treatment is configured such that possible oxygen defects are eliminated.

The dried and post-treated soot body is subsequently vitrified in a sintering furnace at a temperature of about 1750° C. in vacuum ($10^{-2}$ mbar) into a transparent quartz glass blank. Said blank is subsequently homogenized by thermal mechanical homogenization (twisting) and formation of a quartz glass cylinder. Thereafter the hydroxyl group content of the quartz glass cylinder continues to be about 30 wtppm.

For reducing mechanical stresses and for diminishing birefringence and for producing a compaction-resistant quartz glass structure the quartz glass cylinder is subjected to an annealing treatment, as shown by the annealing profile T(t) of FIG. 1 in an embodiment.

In this process the quartz glass cylinder is heated within 15 hours to a temperature of 1180° C. and is kept at said temperature in a first treatment phase for 8 hours in air and at atmospheric pressure. The quartz glass cylinder is subsequently quenched at a high cooling rate of 4° C./h to a temperature of 1080° C.

This is followed by a second treatment phase during which the quartz glass cylinder is further cooled at a low cooling rate of 0.7° C./h to a temperature of 1000° C. Thus this cooling ramp lasts for a total of 114 hours.

Subsequently, cooling is continued to reach a temperature of 750° C., at which the cylinder is kept for another 80 hours for reducing mechanical stresses before it is cooled at a cooling rate of 50° C./h to a temperature of 300° C., and the furnace is then switched off and the quartz glass cylinder is left to the free cooling of the furnace.

The quartz glass cylinder treated in this way has an outer diameter of 350 mm and a thickness of 60 mm. The quartz glass has a mean fictive temperature of 1038° C. Before the next treatment step part of the oversize for the component contour is removed from the end faces of the quartz glass cylinder, namely a thickness of 3 mm.

Thereafter the quartz glass cylinder is kept in a pure hydrogen atmosphere at 380° C., first at an absolute pressure of 2 bar for a period of 300 hours and then at the same temperature at a hydrogen partial pressure of 0 bar for a duration of 25 h and then at an absolute pressure of 0.1 bar for a duration of 850 hours.

The quartz glass cylinder obtained thereafter is substantially free from chlorine, oxygen defects and SiH groups (below the detection limit of $5\times10^{16}$ molecules/$cm^3$), and it is distinguished within a diameter of 280 mm (CA area) by a mean hydroxyl group content of $3\times10^{16}$ molecules/$cm^3$, a mean hydroxyl group content of 30 wtppm and by a mean fictive temperature of 1038° C.

Several quartz glass cylinders were prepared in this way by varying the annealing conditions of the first and the second treatment phase. One variation of the annealing conditions consists in cooling to a temperature of 1050° C. during the second treatment phase and then, starting from this temperature, in subsequently conducting a cyclic sequence of sinusoidal heating and cooling ramps of 0.33° C./min and at an amplitude of 30° C. within a temperature range of up to 1080° C.

Measurements

Measurement samples were taken from the quartz glass cylinders produced in this way for determining the resistance of the quartz glass to irradiation with linearly polarized UV excimer laser radiation of a wavelength of 193 nm. Both the isotropic density change (compaction behavior) and the anisotropic density change (central birefringence) were determined.

Measurement Results

With respect to the compaction behavior a definite correlation between density change and fictive temperature of the different quartz glass samples could not be detected, as has already been mentioned above. Likewise, no definite correlation can be found between the change in the density of the quartz glass samples, depending on the quenching speed of 1180° C. to a low temperature (<980° C.), the minimum cooling rate being 0.56° C./h.

FIG. 2, however, shows that an almost linear correlation exists between the measured compaction "M" and a model function "fit", in which the said two parameters (fictive temperature and annealing duration) are summarized as follows:

$$\text{fit} = c1 \times \left(\frac{t}{\tau}\right)^{1.5} + c2 \times (Tf - Tf0) \tag{1}$$

c1 and c2=constants
t=total temperature duration
$\tau$=fixed temperature-dependent relaxation time
Tf=measured fictive temperature
Tf0=offset relative to the fictive temperature The first term $(t/\tau)^{1.5}$ describes the probability of a transformation from high-temperature phase to low-temperature phase and is thus a measure of the proportion of the low-temperature phase in the respective quartz glass. The second term (Tf–Tf0) is a measure of the fictive temperature of the quartz glass.

The diagram of FIG. 2 thereby shows that the model function for the compaction "fit", which takes into account these two parameters, is scaled with the actually measured compaction. This means that with an increasing proportion of low-temperature phase and with an increasing fictive temperature the sensitivity of the quartz glass samples increases relative to an isotropic density change upon irradiation with linearly polarized laser light radiation of a wavelength of 193 nm. The quartz glass sample, the manufacture of which has been explained above in more detail, is designated in FIG. 2 with reference numeral 21. The corresponding radiation resistance of the quartz glass sample can be regarded as very high.

The diagram of FIG. 3 shows the change in the refractive index "ΔB" (in nm/cm) of the central birefringence in dependence upon the irradiation dose "D", expressed as the product of pulse number P and energy density $\epsilon$ (in $\mu J/cm^2$) of the introduced UV radiation for a total of four different quartz glass qualities (lines of best fit 31 to 34). The samples were here subjected to linearly polarized UV radiation of a wavelength of 193 nm, and the change in birefringence caused thereby was measured from time to time. This yields an approximately linear increase in birefringence with the introduced radiation dose. The four lines of best fit 31 to 24 represent the measurement results for quartz glass qualities with the following annealing temperatures:

Line 31: 4 h holding time at 1100° C., then within 14 h to 1040° C., held at 1040° C. for 1 h. The quartz glass has a fictive temperature of 1093° C.

Line 32: 8 h holding time at 1180° C., then within 72 h to 1040° C., held at 1040° C. for 1 h. The quartz glass has a fictive temperature of 1078° C.

Line 33: 8 h holding time at 1180° C., then within 168 h to 1040° C., held at 1040° C. for 1 h. The quartz glass has a fictive temperature of 1063° C.

Line 34: The quartz glass was produced and annealed according to the invention, as described above.

It becomes apparent from this that the anisotropic density change in all samples increases with the dose of the UV radiation, but that the increase in the sample taken from the quartz-glass produced according to the invention is distinctly smaller than in other quartz glass qualifies. Optical components produced from a corresponding quartz glass quality are particularly suited for use in a projection system of an automatic exposure device for immersion lithography for the purpose of transmitting ultraviolet, pulsed and linearly polarized UV laser radiation of a wavelength between 190 nm and 250 nm.

The invention claimed is:

1. A method for producing an optical component of synthetic quartz glass with radiation resistance in a microlithographic device at an operating wavelength below 250 nm, said method comprising:
   providing a quartz glass blank with a hydroxyl group content of less than 250 wtppm and subjecting the quartz glass blank to a multi-stage annealing treatment comprising the following steps:
   (a) a first treatment phase during which the quartz glass blank is treated in an upper temperature range between 1130° C. and 1240° C. during a first treatment period;
   (b) cooling the quartz glass blank at a first mean cooling rate to a quenching temperature below 1100° C., wherein the quartz glass blank reaches a first fictive temperature with a high mean value of 1100° C. or more; and
   (c) a second treatment phase comprising cooling the quartz glass blank at a second mean cooling rate lower than the first mean cooling rate, the quartz glass blank being treated in a lower temperature range between 950° C. and 1100° C. during a second treatment period such that the quartz glass blank reaches a second fictive temperature with a low mean value that is at least 50° C. lower than the high mean value of the first fictive temperature.

2. The method according to claim 1, wherein the first treatment phase comprises annealing the quartz glass blank in a temperature range of 1150° C. to 1210° C.

3. The method according to claim 1, wherein the second treatment phase comprises annealing the quartz glass blank in a temperature range of from 1000° C. to 1100° C.

4. The method according to claim 1, wherein the quenching temperature is at least 50° C. lower than a treatment temperature in the upper temperature range.

5. The method according to claim 1, wherein the quenching temperature is lower than 1090° C.

6. The method according to claim 1, wherein the first mean cooling rate is at least 1° C./h.

7. The method according to claim 1, wherein the second mean cooling rate is less than 1° C./h.

8. The method according to claim 1, wherein the first mean cooling rate is at least two times the second mean cooling rate.

9. The method according to claim 1, wherein the second treatment phase includes a time sequence of heating and cooling steps in the lower temperature range.

10. The method according to claim 1, wherein the multi-stage annealing treatment further includes post-annealing the quartz glass blank in a temperature range between 650° C. and 850° C.

11. The method according to claim 1, wherein the second fictive temperature of the quartz glass is below 1045° C. after completion of the annealing treatment.

12. The method according to claim 1, wherein the first treatment period is at least 5 hours.

13. The method according to claim 1, wherein the second treatment period is at least 100 hours and not more than 12 days.

14. The method according to claim 1, wherein the quartz glass blank is loaded with hydrogen after the annealing treatment, a mean hydrogen content of the quartz glass being set to a value between $5 \times 10^{15}$ and $1 \times 10^{17}$ molecules/$cm^3$.

15. The method according to claim 1, wherein a mean hydroxyl group content of the quartz glass is set to a value between 5 wtppm and 50 wtppm.

16. A blank made from synthetic quartz glass for producing an optical component for use in a microlithographic device at an operating wavelength below 250 nm, wherein the blank is produced by the method according to claim 1.

17. The method according to claim 1, wherein the quenching temperature is at least 80° C., lower than a treatment temperature in the upper temperature range.

18. The method according to claim 1, wherein the quenching temperature is lower than 1070° C.

19. The method according to claim 1, wherein the first mean cooling rate is at least 2° C./h.

20. The method according to claim 1, wherein the first mean cooling rate is at least 4° C./h.

21. The method according to claim 1, wherein the second mean cooling rate is less than 0.8° C./h.

22. The method according to claim 1, wherein the fictive temperature of the quartz glass is below 1035° C., after completion of the annealing treatment.

23. The method according to claim 1, wherein a mean hydroxyl group content of the quartz glass blank is set to a value between 10 wtppm and 35 wtppm.

* * * * *